(12) United States Patent
Kado

(10) Patent No.: US 9,985,322 B2
(45) Date of Patent: May 29, 2018

(54) BATTERY CLAMPING DEVICE, BATTERY HEATING DEVICE, BATTERY DRYING DEVICE, BATTERY COOLING DEVICE AND METHOD FOR MANUFACTURING BATTERY

(71) Applicant: TOYOTA JIDOSHA KABUSHIKI KAISHA, Toyota-shi (JP)

(72) Inventor: Hiroyasu Kado, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 642 days.

(21) Appl. No.: 14/287,622

(22) Filed: May 27, 2014

(65) Prior Publication Data
US 2014/0356659 A1 Dec. 4, 2014

(30) Foreign Application Priority Data

May 29, 2013 (JP) ................................. 2013-113358

(51) Int. Cl.
| H01M 10/44 | (2006.01) |
|---|---|
| H01M 2/10 | (2006.01) |
| H01M 10/04 | (2006.01) |
| H01M 10/615 | (2014.01) |
| H01M 10/647 | (2014.01) |
| H01M 10/6556 | (2014.01) |
| H01M 10/6571 | (2014.01) |
| H01M 10/6567 | (2014.01) |
| H01M 10/6555 | (2014.01) |
| H01M 10/613 | (2014.01) |
| H01M 2/36 | (2006.01) |

(Continued)

(52) U.S. Cl.
CPC ....... *H01M 10/446* (2013.01); *H01M 2/1005* (2013.01); *H01M 2/1061* (2013.01); *H01M 2/1077* (2013.01); *H01M 10/0481* (2013.01); *H01M 10/613* (2015.04); *H01M 10/615* (2015.04); *H01M 10/647* (2015.04); *H01M 10/6555* (2015.04); *H01M 10/6556* (2015.04); *H01M 10/6567* (2015.04); *H01M 10/6571* (2015.04); *H01M 2/36* (2013.01); *H01M 10/058* (2013.01); *H01M 10/0525* (2013.01); *Y10T 29/49108* (2015.01)

(58) Field of Classification Search
None
See application file for complete search history.

(56) References Cited

U.S. PATENT DOCUMENTS

| 2007/0240300 A1 | 10/2007 | Hasei |
| 2009/0061299 A1 | 3/2009 | Uchida et al. |

(Continued)

FOREIGN PATENT DOCUMENTS

| CN | 101055926 A | 10/2007 |
| CN | 102751451 A | 10/2012 |

(Continued)

*Primary Examiner* — Sarah A. Slifka
(74) *Attorney, Agent, or Firm* — Hunton Andrews Kurth LLP

(57) ABSTRACT

A battery clamping device includes: interposition member configured to be interposed between rectangular parallelepiped batteries such that interposition member is stacked with a plurality of the batteries alternately; clamping portion configured to clamp by pressing the stacked batteries and interposition member in a stacking direction of the batteries and the interposition member from outside in the stacking direction.

9 Claims, 10 Drawing Sheets

(51) Int. Cl.
    *H01M 10/0525* (2010.01)
    *H01M 10/058* (2010.01)

(56) References Cited

U.S. PATENT DOCUMENTS

| | | |
|---|---|---|
| 2010/0167115 A1 | 7/2010 | Okada et al. |
| 2012/0298433 A1 | 11/2012 | Ohkura |
| 2012/0315519 A1 | 12/2012 | Jin |

FOREIGN PATENT DOCUMENTS

| | | |
|---|---|---|
| CN | 102820492 A | 12/2012 |
| JP | 2003-217672 A | 7/2003 |
| JP | 2004-349011 A | 12/2004 |
| JP | 2009-054403 A | 3/2009 |
| JP | 2010-021104 A | 1/2010 |
| JP | 2010-157450 A | 7/2010 |
| JP | 2011-243524 A | 12/2011 |
| JP | 2012-084346 A | 4/2012 |
| JP | 2012-160543 A | 8/2012 |
| JP | 2012-190620 A | 10/2012 |
| JP | 2012-248299 A | 12/2012 |
| JP | 2013-004523 A | 1/2013 |

BATTERY CLAMPING DEVICE, BATTERY HEATING DEVICE, BATTERY DRYING DEVICE, BATTERY COOLING DEVICE AND METHOD FOR MANUFACTURING BATTERY

INCORPORATION BY REFERENCE

The disclosure of Japanese Patent Application No. 2013-113358 filed on May 29, 2013 including the specification, drawings and abstract is incorporated herein by reference in its entirety.

BACKGROUND OF THE INVENTION

1. Field of the Invention

The present invention relates to a battery clamping device for pressing and clamping rectangular parallelepiped batteries, and a battery heating device, a battery drying device, a battery cooling device each provided with the same battery clamping device, and method for manufacturing a battery using the same battery clamping device or the same battery drying device.

2. Description of Related Art

In recent years, a rechargeable/dischargeable battery such as a rectangular parallelepiped lithium ion secondary battery (hereinafter referred to as just battery also) has been used as a driving power source of a vehicle such as a hybrid vehicle, electric vehicle and a portable electronic apparatus such as notebook personal computer, video camcorder. In manufacturing or test of such a battery or manufacturing of a battery pack, there is a case where a plurality of batteries is desired to be clamped. For example, a case of drying the inside of a case of a battery prior to pouring of electrolyte therein (non-sealed battery described below), a case of performing initial charge of a battery prior to the initial charge (not-initially charged battery described below), and a case of performing high-temperature aging of a battery after the initial charge can be mentioned. As a jig (device) for use in this case, Japanese Patent Application Publication No. 2012-190620 (JP 2012-190620 A) has disclosed a battery restraining device (battery clamping device described below) configured to restrain a plurality of rectangular parallelepiped batteries and spacers stacked alternately while applying vibration by using a fixed press head and a movable press head.

However, if the stack is restrained strongly using the above-described battery restraining device (battery clamping device), a plurality of batteries in the stack is pressed strongly in the stacking direction. Accompanied by this, sometimes the battery might swell in a direction perpendicular to the stacking direction (i.e., height direction or width direction of battery) so that in some cases, it might undergo permanent deformation. Particularly, if the battery is configured so that an opening in its bottomed square-section cylindrical battery case main body is sealed with a sealing lid having a larger thickness than that of the bottom portion of the battery case main body, the bottom face of the battery is more likely to swell than the sealing lid. As a result, the height from the bottom face of the battery to the sealing lid is increased. On the other hand, because the extent of the swelling of the bottom face which occurs in the plurality of the batteries after compression differs depending on each battery, when these batteries are assembled into a battery pack with their bottom faces as a standard level, deflection occurs in the position of the sealing lid or an external terminal member provided on the sealing lid among respective batteries with respect to the height direction from their bottom faces. As a result, such an undesirable effect that the external terminal members of adjacent batteries cannot be joined together easily when connecting them using a flat bus bar may occur.

SUMMARY OF THE INVENTION

The present invention provides a battery clamping device capable of preventing deformation of a connecting face which connects the side faces of batteries by swelling even if each of batteries is clamped between the side faces.

An aspect of the present invention provides a battery clamping device which includes: interposition member configured to be interposed between rectangular batteries such that interposition member is stacked with a plurality of the batteries alternately; clamping portions configured to clamp by pressing the stacked batteries and the interposition members in a stacking direction of the batteries and the interposition member from outside in the stacking direction, wherein the interposition member has interposition portion which is interposed between the batteries and contact a side face perpendicular to the stacking direction of the battery and has a base portion which is formed integrally with the interposition portion so as to be stretched at least to one side in the stacking direction from an end portion of the interposition portion thereby the base portion contacts a connecting face of the battery which connects the side faces of the battery to each other.

The above-described interposition member of the battery clamping device includes interposition portions which are interposed between the batteries and the base portion which is formed integrally with the interposition portions so as to be stretched at least to one side in the stacking direction from an end portion of the interposition portion thereby contacting the connecting face of the battery. In the meantime, because the clamping portions clamp the batteries and the interposition members in the stacking direction, the side faces of the battery contact the interposition portion of the interposition members. As a result, the battery is kept in a state in which it is unlikely to be moved (displaced) in a height direction or in a width direction perpendicular to the stacking direction with respect to the interposition portions. On the other hand, the base portion is formed integrally with the interposition portion. Thus, even if the connecting face of the battery which contacts the base portion attempts to be deformed as if it swells, the deformation is suppressed by the base portion. As a result, the above-described battery clamping device can clamp the batteries together with the interposition members in the stacking direction. Even if it clamps strongly, the connecting face of the battery which contacts the base portion can be prevented from swelling or the swelling can be prevented from turning to permanent deformation.

In the meantime, it is desirable to use this battery clamping device as a device (jig) for clamping, a plurality of the batteries upon manufacturing or experimenting the batteries. As the case of clamping the batteries, for example, a case of drying the electrode body or the like in the battery by heating or depressurizing about a battery prior to pouring electrolyte (non-sealed battery described below), a case of performing initial charge of the battery, and a case of performing high-temperature aging of the battery after the initial charge can be mentioned. Further, as the interposition member, a type in which the base portion is stretched to one side in the stacking direction from an end portion of the interposition portion (L-shape in cross section) and a case in which the base portion is stretched to both sides in the stacking direction (inverted T-shape in cross section) can be mentioned.

Further, the above-described battery clamping device may be a battery clamping device in which the base portion of the interposition member, when the battery is clamped between the interposition member and adjacent interposition member, is apart from the adjacent interposition member in the stacking direction.

In the above-described battery clamping device, when the battery is clamped in the stacking direction, the base portion is apart from the adjacent interposition member in the stacking direction so that they never contact each other. Thus, the interposition portions of the interposition member can be brought with the side faces of the battery equally without any distortion in a state in which the battery is clamped between the interposition portions of the interposition member.

Further, the battery clamping device of the present invention may be any battery clamping device described above in which the base portion of the interposition member is stretched to both sides in the stacking direction from the end portion of the interposition portion.

Because in the above-described battery clamping device, the base portions are stretched to both sides in the stacking direction from the interposition portions, when it is mounted on a flat plate with the base portions directed downward and the interposition portions directed upward, the interposition member is more unlikely to fall down and easier to handle than a type in which the base portion is stretched to one side.

The battery clamping device of the present invention may be any battery clamping device described above wherein the base portion has a configuration in which a sum of the dimensions of the base portions stretched in the stacking direction from the interposition portion is smaller than a gap between the side faces of the battery in the stacking direction.

Because in the above-described battery clamping device, the sum of the dimensions of the base portion is smaller than the gap between the side faces of the battery (thickness in the stacking direction of the battery), when the batteries are clamped in the stacking direction by the battery clamping device as described above, the base portions are apart from each other in the stacking direction so that they never contact each other. Thus, the interposition portions of the interposition member can be brought into pressure contact with the side faces of the battery securely.

Further, another aspect of the present invention provides a battery heating device including: any battery clamping device according described above; a heater on which the battery clamping device clamping the batteries is to be mounted to heat the batteries, wherein the interposition member includes a battery contact face of the base portion which contacts the connecting face of the battery and includes a bottom face which is located on an opposite side to the battery contact face across the base portion and opposed to the heater, and wherein the heater provides a bottom face contact face which the bottom face of the interposition member contacts and is configured to be capable of heating the interposition member via the bottom face which contacts the bottom face contact face.

The above-described battery heating device includes the aforementioned battery clamping device and the heater on which the battery clamping device clamping the batteries mounted to heat the batteries. In addition, the heater is configured to be capable of heating the interposition member via the bottom face of the interposition member which contacts the bottom face contact face. Thus, heat can be transmitted from the heater to the end portion and the base portion of the interposition portion efficiently. Further, not only heat can be transmitted from the end portion and the base portion to the battery via the connecting face of the battery which contacts the base portion but also heat can be transmitted to the battery via the side faces which contact the interposition portions. As a result, the battery can be heated efficiently.

Further, the battery heating device of the present invention may be any battery heating device described above in which the bottom face of the interposition member is formed into a flat face and the bottom face contact face of the heater is a flat face which contacts the bottom face of any of the interposition members.

In the above-described battery heating device, the bottom face of the interposition member is formed into a flat face. Further, because the bottom face contact face of the heater is a flat face which contacts the bottom face of any interposition member, the entire bottom face of each interposition member can be brought into contact with the bottom face contact face of the heater. Thus, heater from the heater can be transmitted directly from the bottom face contact face of the heater to the interposition member via the bottom face of the interposition member efficiently and as a result, the battery can be heated securely.

Further, the battery heating device of the present invention may be any battery heating device described above in which the interposition member is made of metal having thermal conductivity of 100 W/(m·K) or more.

In the above-described battery heating device, the interposition member is made of highly thermally conductive metal having a thermal conductivity of 100 W/(m·K) or more. Thus, heat transmitted to the interposition member directly from the heater can be transmitted to the battery via the base portion and the interposition portions efficiently thereby heating the battery more appropriately. Particularly, in transmitting heat to the battery via the side face of the battery in which a distance from the bottom face of the interposition member is larger than the connecting face of the battery, using highly thermally conductive metal for the interposition portions enables heat to be transmitted to the battery via the interposition portions and the side faces efficiently.

In the meantime, as a metal having thermal conductivity of 100 W/(m·K) or more, for example, aluminum (236 W/(m·K)), aluminum alloy having alloy number A6061 (155 W/W/(m·K)), copper (398 W/W/(m·K)), brass (brass, 106 W/W/(m·K)) and the like can be mentioned.

Still another aspect of the present invention provides a battery drying device including: any battery heating device described above and a depressurizing device containing a depressurizing chamber capable of accommodating the battery heating device and a depressurizing pump for depressurizing the depressurizing chamber.

The above-described battery drying device includes the depressurizing unit for depressurizing the depressurizing chamber which accommodates the battery heating device as well as the battery heating device provided with the aforementioned battery clamping device and the heater. Thus, in drying the non-sealed batteries in which the communication hole such as the liquid pouring hole of the battery has not been yet sealed in a state in which they are clamped by the battery clamping device, the base portion of the interposition member is in contact with the connecting faces of the non-sealed battery and the interposition portions of the interposition member are in pressure contact with the side faces of the non-sealed battery. Thus, heat transmitted to the interposition member directly from the heater can be transmitted to the non-sealed battery via the interposition portions and the base portion, thereby heating the non-sealed battery. In this way, the battery drying device is capable of heating the battery efficiently and drying the battery efficiently.

Still further aspect of the present invention provides a battery cooling device including: any battery clamping device described above, and a cooling unit on which the battery clamping device clamping the battery is mounted to cool the batteries, wherein the interposition member contains a battery contact face of the base portion which contacts the connecting face of the battery and contains a bottom face which is located on an opposite side to the battery contact face across the base portion and opposed to the cooling unit, and wherein the cooling unit provides a bottom face contact face which the bottom face of the interposition member contacts and is configured to be capable of cooling the interposition member via the bottom face which contacts the bottom face contact face.

The above-described battery cooling device includes the aforementioned battery clamping device and a cooling unit on which the battery clamping device clamping the batteries is mounted to cool the batteries. In addition, the cooling unit is configured to be capable of cooling the interposition member via the bottom face of the interposition member which contacts the bottom face contact face. Thus, heat can be transmitted from the bottom face contact face of the interposition member to the cooling unit efficiently. Further, in the battery clamping device clamping the batteries, the base portion of the interposition member contacts the connecting face of the battery and the interposition portions of the interposition member contacts the side faces of the battery with pressure. As a result, heat from the battery can be transmitted to the base portion via the connecting face of the battery and to the end portion of the interposition portion via the side faces of the battery also. Further, heat can be transmitted to the cooling unit via the bottom face of the interposition member. As a result, the battery can be cooled efficiently.

Further, the battery cooling device of the present invention may be any battery cooling device described above wherein the bottom face of the interposition member is formed into a flat face and wherein the bottom face contact face of the cooling unit is a flat face which contacts the bottom face of any of the interposition members also.

In the above-described battery cooling device, the bottom face of the interposition member is formed into a flat face. Further, because the bottom face contact face of the cooling unit is a flat face which contacts the bottom face of any interposition member, the entire bottom face of each interposition member can be brought into contact with the interposition member contact face of the cooling unit. As a result, heat from the battery can be transmitted to the cooling unit via the bottom face of the interposition member and the interposition member contact face of the cooling unit efficiently, thereby cooling the battery securely.

Further, the battery cooling device of the present invention may be any battery cooling device described above wherein the interposition member is made of metal having thermal conductivity of 100 W/(m·K) or more.

In the above-described battery cooling device, the interposition member is made of highly thermally conductive metal having a thermal conductivity of 100 W/(m·K) or more. Thus, heat of the battery can be transmitted directly to the cooling unit via the interposition portions and the base portion of the interposition member efficiently thereby cooling the battery further securely. Particularly, in transmitting heat via the side face of the battery in which a distance from the bottom face of the interposition member is larger than the connecting face of the battery, using highly thermally conductive metal for the interposition portions enables heat to be transmitted to the cooling unit via the side faces and the interposition portions of the battery efficiently.

Still further aspect of the present invention provides a method for manufacturing a rectangular parallelepiped battery using any battery clamping device described above, including: a battery clamping step of interposing the interposition member between not-initially charged batteries which have not yet undergone the initial charge and, clamping the not-initially charged battery with the clamping portions by pressing the batteries in the stacking direction, with the connecting face of the not-initially charged battery kept in contact with the base portion, and an initial charging step of performing the initial charge of each of the clamped not-initially charged batteries.

The above-described method for manufacturing the battery includes the battery clamping step of clamping the not-initially charged batteries by means of the battery clamping device and the initial charging step of performing the initial charge of the not-initially charged batteries. Thus, in the not-initially charged batteries clamped with an appropriate pressing force, deformation by swelling of the connecting face of the battery can be prevented from being generated so as to perform the initial charge. Thus, when constructing a battery pack using manufactured batteries, for example, even if the plural batteries are arranged on a flat plate such that their connecting faces are kept in contact with the flat plate, the batteries whose heights from the connecting faces are equal between those batteries can be produced.

Still further aspect of the present invention provides a method for manufacturing a rectangular parallelepiped battery including: a non-sealed battery clamping step of, interposing the interposition member between the non-sealed batteries whose communication hole for communicating the inside and outside of the battery has not been yet sealed, by using the battery clamping device in the aforementioned battery drying device, and, clamping the non-sealed batteries by pressing the non-sealed battery in the stacking direction by using the clamping portions to clamp the non-sealed batteries, with the connecting face kept in contact with the portion; heating/drying step of heating and drying the inside of the non-sealed battery via the communication hole heating the non-sealed battery by heating the battery clamping device clamping the non-sealed batteries by means of the heater, depressurizing the depressurizing chamber which accommodates the non-sealed batteries clamped by the battery clamping device and heated; and liquid pouring step of, pouring electrolyte into the inside of the non-sealed battery via the communication hole, after the heating/drying step; and sealing step of sealing the communication hole.

The above-described method for manufacturing the battery includes the non-sealed battery clamping step, the heating/drying step, the liquid pouring step, and the sealing step. In the non-sealed battery clamping step, the interposition portions of the interposition member come to contact the side faces of the non-sealed battery and at the same time, the base portion of the interposition member contacts the connecting faces of the non-sealed battery. Thus, in the heating/drying step, heat from the heater can be transmitted to the non-sealed battery via the interposition portions and the base portion of the interposition member, thereby heating the non-sealed battery. In addition, because the non-sealed battery has been already heated prior to depressurization, heat is transmitted to each portion in the battery via air in the battery. Thus, compared to a case of heating and drying with radiation of heat under reduced pressure (under vacuum), the non-sealed battery can be heated efficiently in a short time and consequently, the inside of the battery can be dried.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
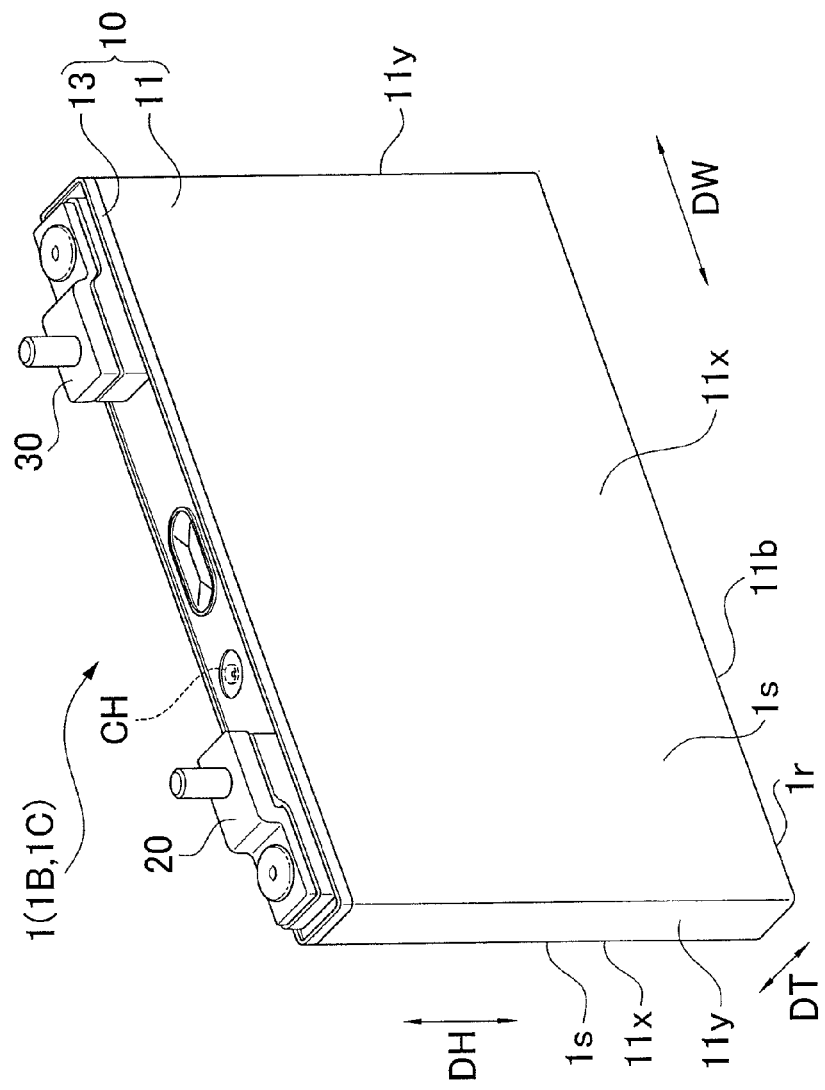
FIG. 1 is a perspective view of a battery according to the first to fourth embodiments.
Figure 2:
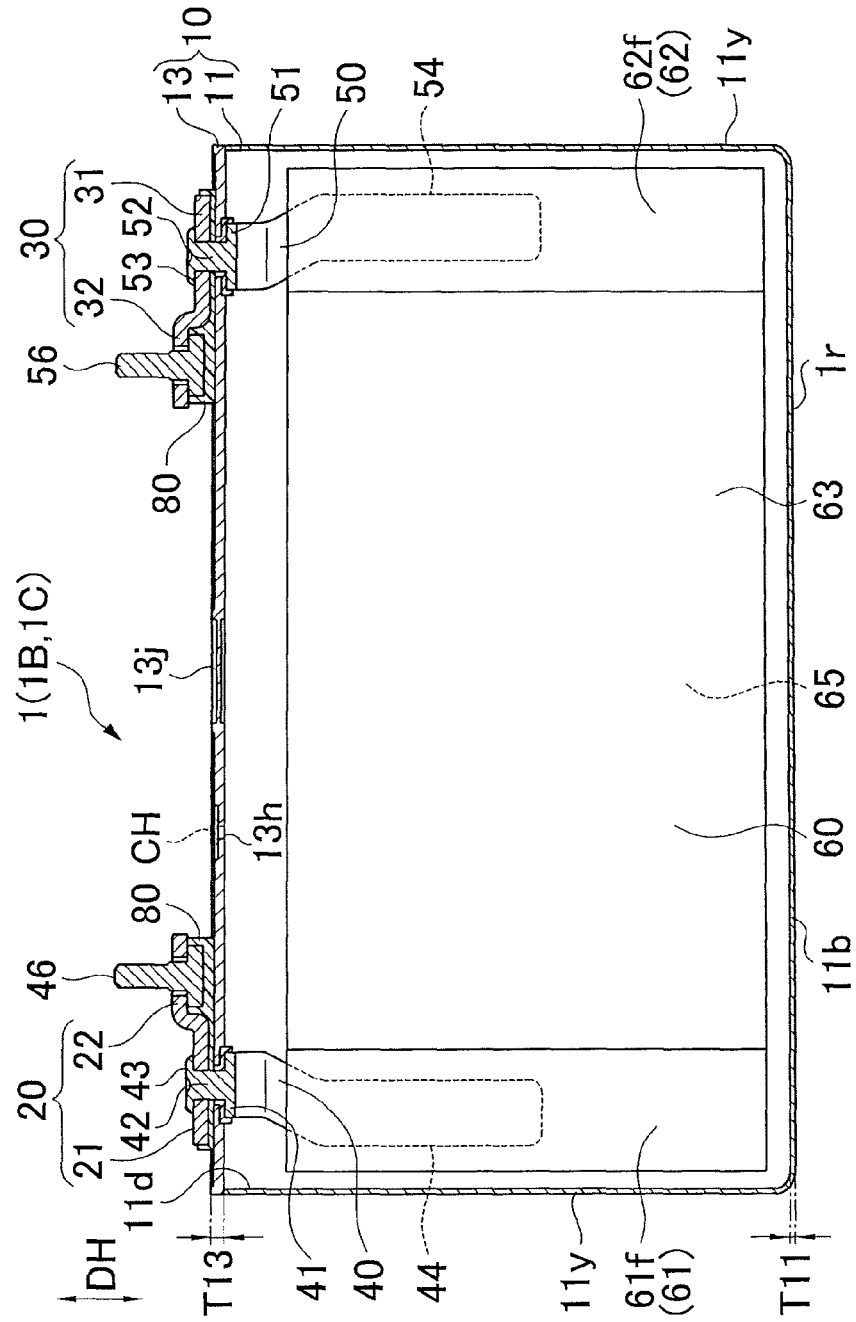
FIG. 2 is a longitudinal sectional view of the battery according to the first to fourth embodiments.

Next, the embodiment of the present invention will be described with reference to the accompanying drawings. First, a battery 1 manufactured according to a manufacturing method of the battery according to the first embodiment will be described. As shown in FIGS. 1, 2, the battery 1 is a rectangular parallelepiped lithium ion secondary battery which includes a battery case 10, a positive electrode external terminal member 20 and a negative electrode external terminal member 30, which are fixed on the battery case 10. The battery 1 further includes an electrode body 60 accommodated in the battery case 10, a positive electrode extending member 40 which is connected to a positive electrode sheet 61 of the electrode body 60 in the battery case 10 and extends outside through the sealing lid 13 of the battery case 10, and a negative electrode extending member 50 which is connected to a negative electrode sheet 62 of the electrode body 60 and extends outside through the sealing lid 13 (see FIG. 2). The battery 1 further includes a positive electrode bolt 46 which is located outside the sealing lid 13 and electrically connected to the positive electrode external terminal member 20 and a negative electrode bolt 56 which is located outside the sealing lid 13 and electrically connected to the negative electrode external terminal member 30. In the first embodiment, it is assumed that DH in the height direction of the battery 1 is a direction from down to up in FIG. 1, DW in the width direction of the battery 1 is a direction from left to right in FIG. 1 and DT in the thickness direction of the battery 1 is a direction from left up to right down in FIG. 1.

The electrode body 60 is a flat wound electrode body which is formed by winding a belt-like positive electrode sheet 61 and negative electrode sheet 62 via a separator 63 into a flat shape. Of these components, the separator 63 of porous resin is impregnated with electrolyte 65 (see FIG. 2). The positive electrode sheet 61 includes a belt-like positive electrode foil 61f made of aluminum and active substance layer (not shown) arranged on part of the surface of the positive electrode foil 61f. On the other hand, the negative electrode sheet 62 includes a belt-like negative electrode foil 62f made of copper and negative electrode active substance layer (not shown) arranged on part of the surface of the negative electrode foil 62f.

Further, the positive electrode extending member 40 made of aluminum includes a pedestal portion 41, an axial portion 42, a positive electrode connecting portion 44, and a positive electrode caulking portion 43 (see FIG. 2). Of these components, the positive electrode caulking portion 43 is a part which is continuous with the top end of the axial portion 42, and formed into a disk shape by being caulked (deformed to swell in diameter) so that it is electrically and mechanically connected to the positive electrode external terminal member 20. Further, the positive electrode connecting portion 44 is connected (welded) to the positive electrode sheet 61 (positive electrode foil 61f) of the electrode body 60.

The positive electrode external terminal member 20 is a plate member of aluminum formed into a crank shape (see FIGS. 1 and 2). The positive electrode external terminal member 20 includes a flat fixing portion 21 which is fixed to the battery case 10 (sealing lid 13) by the above-described positive electrode caulking portion 43 and a flat bolt insertion portion 22 through which the positive electrode bolt 46 is inserted (see FIG. 2). In the meantime, when constructing a battery pack (not shown) using a plurality of the batteries 1, 1, a bus bar (not shown) is placed on the bolt insertion portion 22 and coupled with the positive electrode bolts 46.

On the other hand, the negative electrode extending member 50 made of copper includes a pedestal portion 51, an axial portion 52, a negative electrode connecting portion 54, and a negative electrode caulking portion 53 like the aforementioned positive electrode extending member 40. Of these components, the negative electrode caulking portion 53 is formed into a disk shape by being caulked so that it is electrically and mechanically connected to the negative electrode external terminal member 30. On the other hand, the negative electrode connecting portion 54 is connected (welded) to the negative electrode sheet 62 (negative electrode foil 62f) of the electrode body 60.

The negative electrode external terminal member 30 is a plate member of copper formed into a crank shape (see FIGS. 1 and 2). The negative electrode external terminal member 30 includes a fixing portion 31 which is fixed to the battery case 10 (sealing lid 13) by the negative electrode caulking portion 53 and a bolt insertion portion 32 through which the negative electrode bolt 56 is inserted (see FIG. 2).

In the meantime, when constructing a battery pack (not shown) using a plurality of the batteries 1, 1, a bus bar (not shown) is placed on the bolt insertion portion 32 and coupled with the negative electrode bolts 56.

On the other hand, the rectangular parallelepiped battery case 10 is constituted of a bottomed square-section cylindrical case main body 11 having an opening 11*d* and a rectangular sheet-like sealing lid 13 for sealing the opening 11*d* of the case main body 11 (see FIG. 2). Of these components, the positive electrode external terminal member 20 and the negative electrode external terminal member 30 are fixedly installed to the rectangular sheet-like sealing lid 13 via insulating resin member 80 (see FIG. 2). Further, the sealing lid 13 contains a safety valve 13*j* which is located between the positive electrode external terminal member 20 and the negative electrode external terminal member 30 and a liquid pouring hole 13*h* which is located between the safety valve 13*j* and the positive electrode external terminal member 20 (see FIG. 2). Of these components, the liquid pouring hole 13*h* is a through hole used not only for pouring electrolyte (not shown) into the inside of the battery 1 (battery case 10) but also discharging moisture by communicating the inside and outside of the battery 1 with outside when drying the inside of the battery 1 (battery case 10) (drying step described below). In the meantime, as shown in FIG. 2, in the completed battery 1, the liquid pouring hole 13*h* is closed with a sealing plug CH made of metal. In the first embodiment, the thickness T13 (T13=1.4 mm) of the sealing lid 13 is larger than the thickness T11 (T11=0.7 mm) of the bottom portion 11*b* of the case main body 11 described next. Thus, in the battery case 10, the bottom portion 11*b* of the case main body 11 is more likely to be deformed than the sealing lid 13.

The case main body 11 which constructs the battery case 10 is constituted of the rectangular flat bottom portion 11*b* which is located down in the height direction DH and four side wall portions (a pair of first side wall portions 11*x*, 11*x*, and a pair of second side wall portions 11*y*, 11*y*) which rise in the height direction DH from four edges of the bottom portion 11*b* (see FIG. 1). Of the four side wall portions, two second side wall portions 11*y*, 11*y* are located on both sides in the width direction DW of the battery 1 such that they are opposed to each other (see FIG. 1). On the other hand, two first side wall portions 11*x*, 11*x* are located on both sides in the thickness direction DT of the battery 1 (battery case 10) such that they are opposed to each other (see FIG. 1). In the meantime, when clamping a plurality of the batteries 1, 1 using the battery clamping device 110 described below, the batteries 1, 1 are arranged in the thickness direction DT such that they are stacked one upon another. At this time, the first side wall portion 11*x*, specifically, a side face 1*s* of the battery 1 which constitutes the first side wall portion 11*x* contacts an interposition member 130 (interposition portion 131) described below. Further, the bottom portion 11*b*, specifically, a bottom face 1*r* of the battery 1 which is configured by the bottom portion 11*b* contacts a base portion 132 of the interposition member 130 described below. In the battery 1, the bottom face 1*r* is one of four connecting faces which connect the two side faces 1*s*, 1*s* (bottom face 1*r* which is configured by the bottom portion 11*b*, a face which is configured by the first side wall portion 11*x*, and a face which is configured by the sealing lid 13). In the meantime, because the battery 1 of the present embodiment is manufactured using the battery clamping device 110 described next, no deformation by swelling downward of the bottom portion 11*b*, which can occur when the battery 1 is compressed in the thickness direction DT, is generated in the bottom portion 11*b* of the case main body 11.

Next, the manufacturing method of the battery 1 according to the first embodiment will be described. The manufacturing method of the battery 1 includes: clamping step for clamping non-sealed batteries 1B whose liquid pouring holes 13*h* in the battery case 10 have not been sealed of the above-described batteries 1 (which refers to a battery in which electrolyte 65 has not yet been poured with the sealing plug CH indicated with a dotted line, removed from the battery 1 shown in FIGS. 1, 2, and is referred to as just battery 1B also) such that they are stacked in the aforementioned thickness direction DT; heating/drying step for heating the non-sealed batteries 1B, depressurize the heated non-sealed batteries 1B in a depressurizing chamber 171 and drying the inside of the non-sealed batteries 1B; liquid pouring step; and sealing step.

Figure 3:
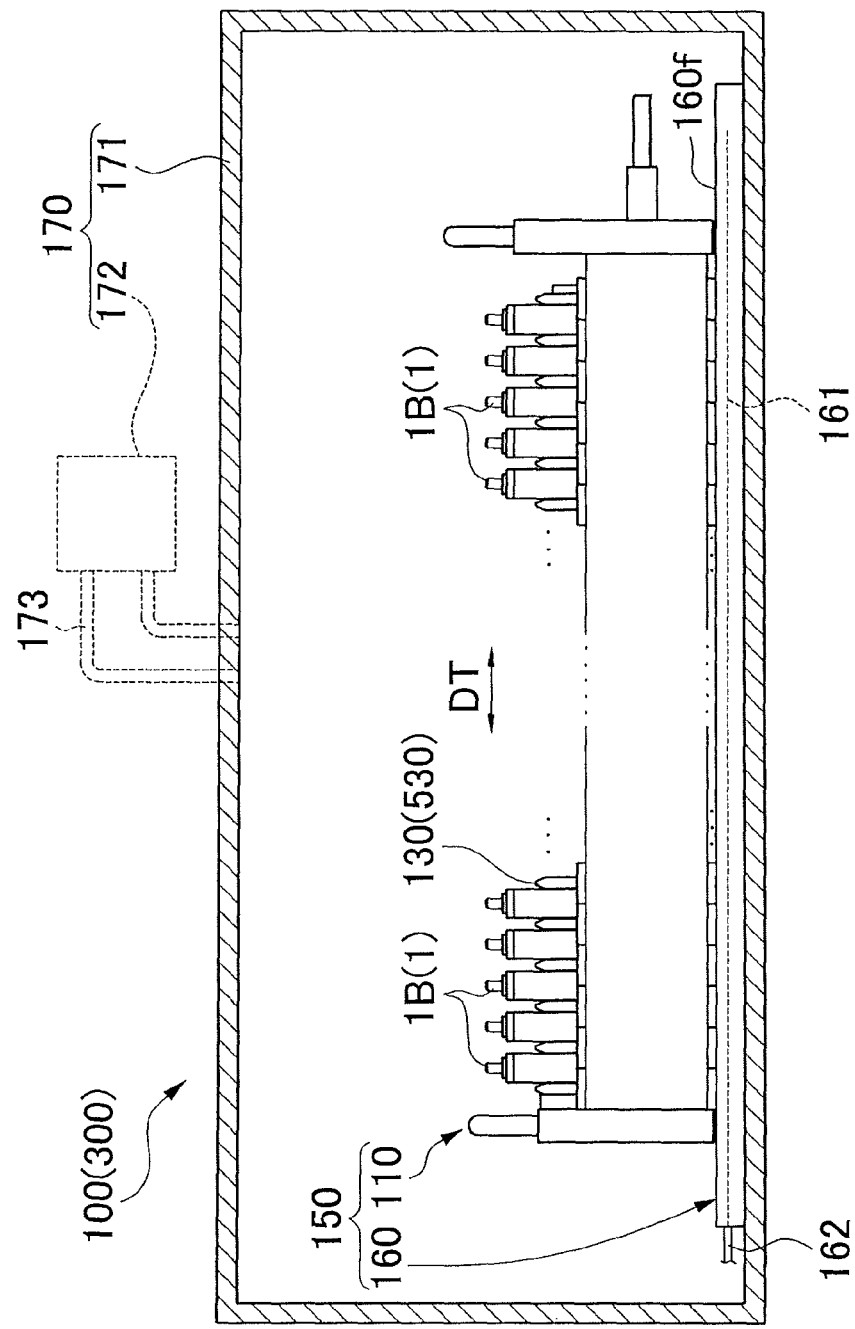
FIG. 3 is an explanatory diagram of a battery heating device and a battery drying device according to the first embodiment and a battery heating device according to the third embodiment.

Of the above-described steps, the clamping step and the heating/drying step use a battery drying device 100 shown in FIG. 3. This battery drying device 100 is constituted of a battery heating device 150 and a depressurizing device 170. The battery heating device 150 is constituted of a battery clamping device 110 which clamps a plurality of non-sealed batteries 1B, 1B such that they are stacked in the thickness direction DT and a plate heater 160. On the other hand, the depressurizing device 170 includes the battery heating device 150, specifically, a depressurizing chamber 171 capable of accommodating the battery clamping device 110 for clamping the non-sealed batteries 1B and the plate heater 160 on which the same battery clamping device 110 is mounted, and a vacuum pump 172 shown with a dotted line in FIG. 3 and for depressurizing the depressurizing chamber 171 by discharging air in the depressurizing chamber 171 through an exhaust pipe 173. In the first embodiment, the plurality of the non-sealed batteries 1B, 1B are arranged in the thickness direction DT such that they are stacked one upon another and clamped in the thickness direction DT. That is, the stacking direction of the batteries 1B coincides with the thickness direction T. Thus, thereinafter, the thickness direction DT is also referred to as stacking direction DT.

In the depressurizing device 170, the vacuum pump 172 is capable of depressurizing the inside of the depressurizing chamber 171 into a vacuum state (specifically, a state whose vacuum degree is 1 kPa or less). On the other hand, the plate heater 160 is a flat plate which provides a flat mounting face 160*f* on which the battery clamping device 110 is mounted. As shown with a dotted line in FIG. 3, a rectangular flat electric heater 161 which generates heat when powered up is arranged in the plate heater 160 and a lead wire 162 to be connected to a power source (not shown) extends from the electric heater 161. The mounting face 160*f* of the plate heater 160 has a size which allows the battery clamping device 110 clamping the non-sealed batteries 1B to be entirely mounted thereon. As described below, when the battery clamping device 110 is mounted on the mounting face 160*f* of the plate heater 160, the mounting face 160*f* contacts the bottom face 130*b* of each of the interposition members 130 and the battery 1B can be heated through the bottom face 130*b* of the interposition members 130.

The battery clamping device 110 includes a plurality of the interposition members 130 which are interposed between one and another of the plurality of the non-sealed batteries 1B, a clamping structure 120 which presses and clamps the non-sealed batteries 1B and the interposition members 130 from outside in the stacking direction DT, and a rectangular frame portion 140 which surrounds the peripheries (four sides) of the stacked non-sealed batteries 1B and interposition members 130.

Figure 4:
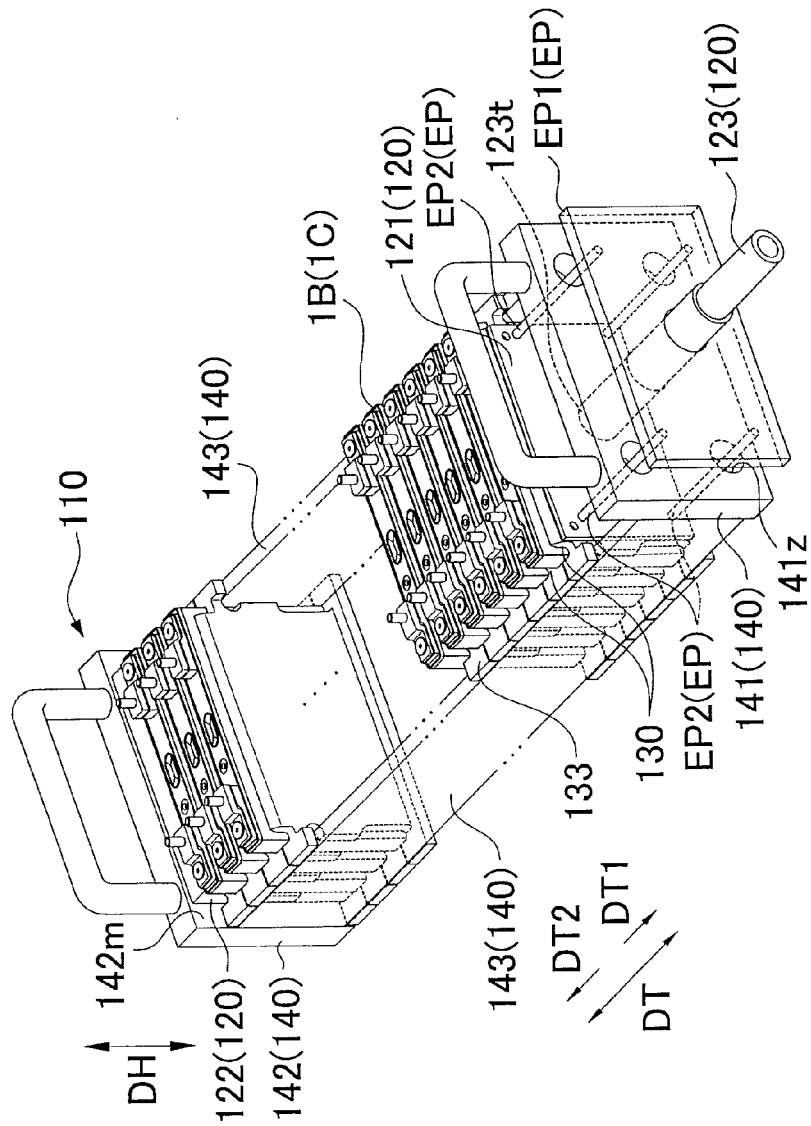
FIG. 4 is a perspective view of a battery clamping device according to the first to fourth embodiments.

The frame portion 140 is constituted of rectangular plates, i.e., a first wall portion 141 which is located on one side DT1 (lower right in FIG. 4) in the stacking direction DT of the battery 1B, a second wall portion 142 which is located the other side DT2 (upper left in FIG. 4) in the stacking direction DT, and two connecting plate portions 143, 143 which are rectangular plates extending in the stacking direction DT, connecting the first wall portion 141 with the second wall portion 142. Of these components, a stopper bolt 123 (described below) which constructs the clamping structure 120 passes through the center of the first wall portion 141. On the other hand, of the principle surfaces of the second wall portion 142, a second end plate 122 (described below) which constitutes the clamping structure 120 contacts a principle surface 142m directed to the DT1 (inside) which is one side of the stacking direction.

Further, the clamping structure 120 includes the first end plate 121 and the second end plate 122, which are rectangular plates, and the stopper bolt 123. Of these components, the first end plate 121 is arranged on DT 1 which is one side in the stacking direction with respect to the stacked batteries 1B and interposition members 130 and on the DT2 which is the other side with respect to the first wall portion 141 of the frame portion 140. On the other hand, the second end plate 122 is arranged on DT2 which is the other side in the stacking direction with respect to the stacked batteries 1B and interposition members 130 and on DT1 which is the one side with respect to the second wall portion 142 of the frame portion 140. Trapezoidal threads are formed on the periphery of the stopper bolt 123 and the stopper bolt 123 passes through the first wall portion 141 of the frame portion 140 such that the stopper bolt 123 is threaded therewith. In the meantime, because the stopper bolt 123 moves toward the other side DT2 in the stacking direction when rotated in the normal direction, a front end portion 123t of the other side DT2 in the stacking direction of the stopper bolt 123 can be brought into contact with the first end plate 121 toward the one side DT 2 in the stacking direction. Thus, with the non-sealed batteries 1B and the interposition members 130 stacked alternately between the first end plate 121 and the second end plate 122, the stopper bolt 123 is turned in the normal direction. Then, the front end portion 123t of the stopper bolt 123 comes into contact with the first end plate 121 so as to press the first end plate 121 toward the other side DT2 in the stacking direction via the front end portion 123t. Consequently, the first end plate 121 can be brought close to the second end plate 122, so that the non-sealed batteries 1B and the interposition members 130 can be clamped between the first end plate 121 and the second end plate 122 by pressing in the stacking direction DT. With the non-sealed batteries 1B and the interposition members 130 pressed in the stacking direction DT, the normal turning of the stopper bolt 123 is stopped and then, the stopper bolt 123 is fixed to the first wall portion 141 of the frame portion 140. As a result, a position of the first end plate 121 in the stacking direction DT can be fixed, so that the non-sealed batteries 1B and the interposition members 130 can be pressed and clamped by the first end plate 121 and the second end plate 122.

In the meantime, in the first embodiment, when pressing the non-sealed batteries 1B and the interposition members 130, a pressing tool EP (see FIG. 4) capable of pressing the first end plate 121 toward the other side DT2 in the stacking direction can be used as well as the above-described stopper bolt 123. The pressing tool EP has a rectangular flat main body EP1 and cylindrical pressing portions EP2 projecting toward the other side DT2 in the stacking direction from four corners of the main body EP1. Of these components, the center of the main body EP1 has a through hole which allows the stopper bolt 123 to pass through in the stacking direction DT. Further, the pressing portion EP2 contacts the first end plate 121 via through holes 141z which go through in the stacking direction DT provided in the first wall portion 141 of the frame portion 140. The above-described pressing tool EP is used as follows. With the non-sealed batteries 1B and the interposition members 130 stacked between the first end plate 121 and the second end plate 122, the main body EP1 is moved toward the other side DT2 in the stacking direction until a desired reaction force is obtained and the first end plate 121 is pressed toward the other side DT2 in the stacking direction by means of the pressing portion EP2. After that, the stopper bolt 123 is advanced toward the other side DT2 in the stacking direction by turning in the normal direction, so that the front end portion 123t is brought into contact with the first end plate 121 and the stopper bolt 123 is fixed. After that, the pressing tool EP is removed. As a result, the non-sealed batteries 1B and the interposition members 130 can be pressed in the stacking direction DT with a desired pressing force and clamped between the first end plate 121 and the second end plate 122.

Figure 5:
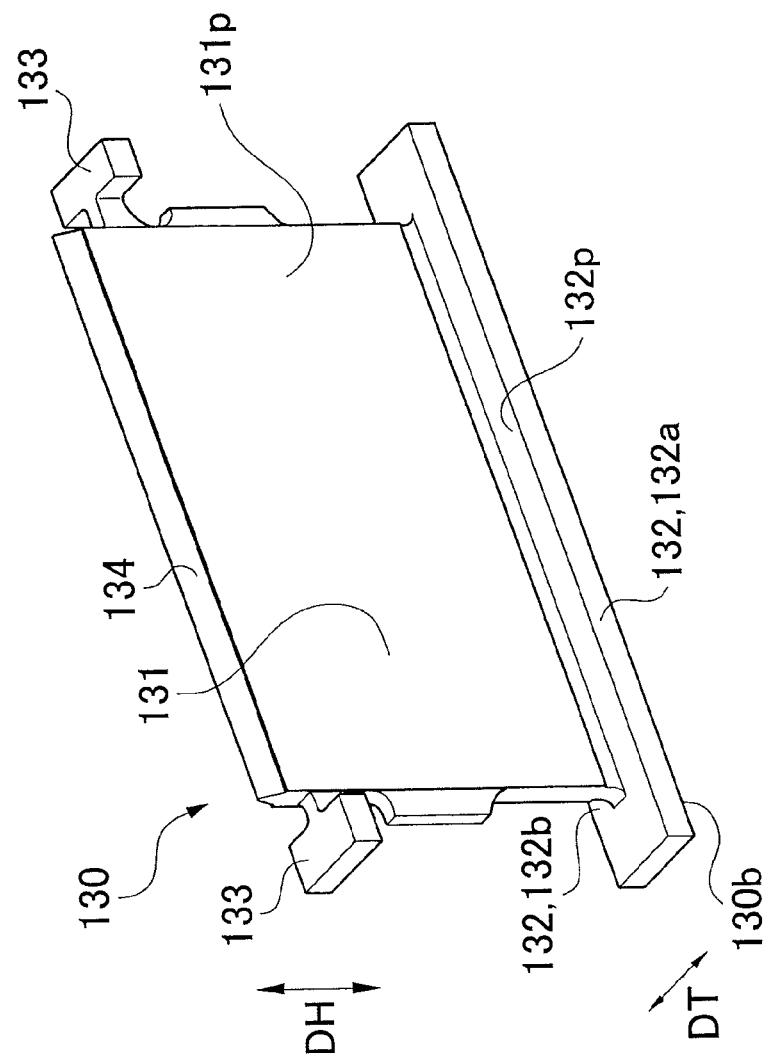
FIG. 5 is a perspective view of an interposition member for use in the battery clamping device according to the first to fourth embodiments.
Figure 6:
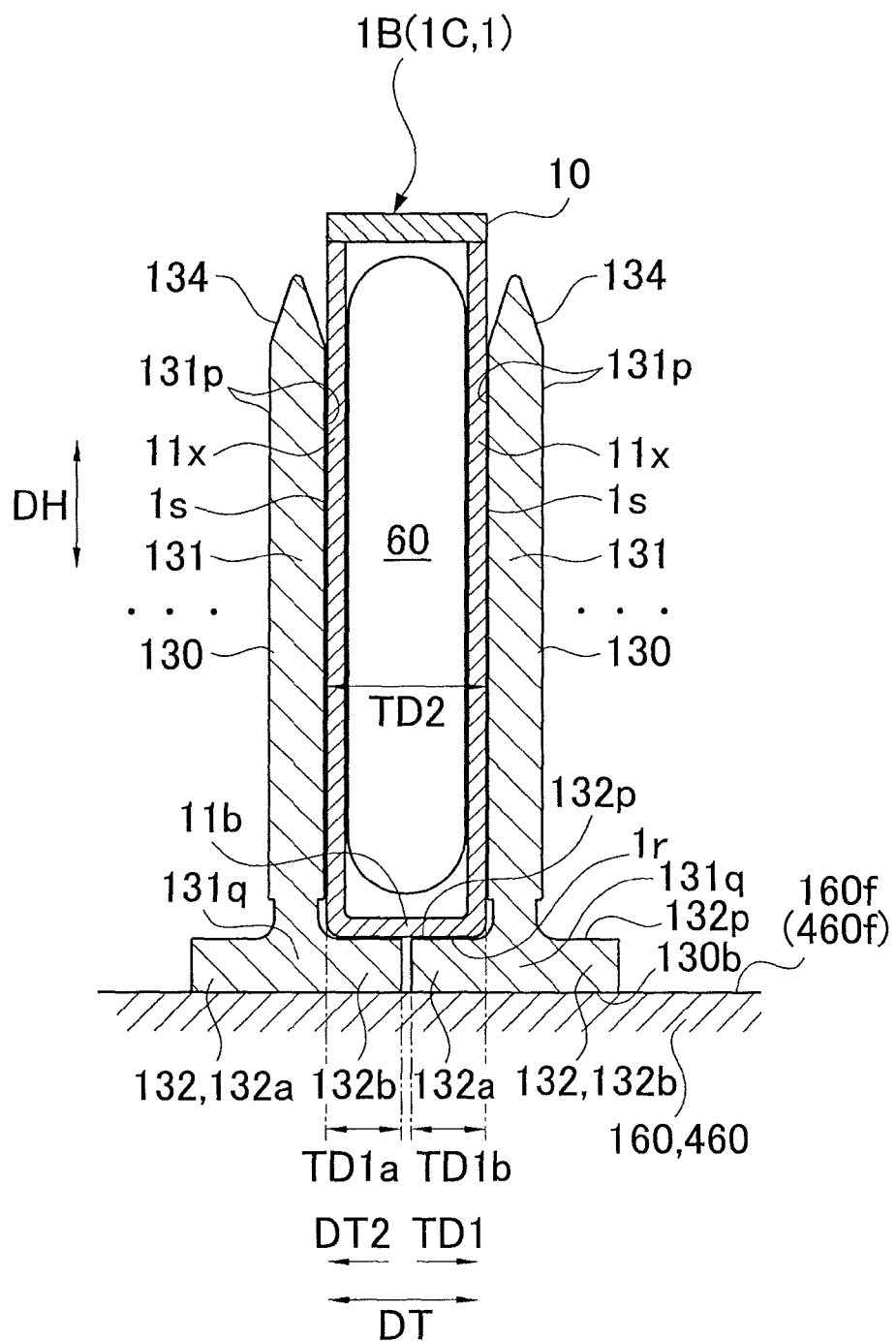
FIG. 6 is a sectional view of a battery and an interposition member clamped by the battery clamping device according to the first to fourth embodiments.

The interposition member 130 is made of aluminum alloy having a thermal conductivity of 155 W/(m·K), and formed integrally and an entire external surface thereof undergoes black-colored alumite treatment. As shown in FIGS. 5, 6, the interposition member 130 has an inverted T-shape in its cross section, and contains flat interposition portions 131 each of which is interposed between one non-sealed battery 1B and another, while contacting a first side wall portion 11x (side face 1s) of the non-sealed battery 1B. In addition, the interposition member 130 further includes the base portion 132 which surrounds an end portion 131q located at the bottom of the interposition portion 131 in FIG. 6. In the meantime, in the base portion 132, portions which swell both to the one side DT1 and the other side DT2 in the stacking direction DT from the end portion 131q of the interposition portion 131 are referred to as the base portion 132a, 132b. On the other hand, a triangular tapered portion 134 whose thickness decreases along the height direction DH toward an apex thereof is provided on the top of the interposition portion 131. Further, the interposition member 130 has projecting portions 133 which project to the connecting plate portions 143 side of the frame portions 140 from the interposition portion 131 (see FIG. 5).

When the aforementioned frame portion 140 is brought up, the projecting portion 133 engages with the connecting plate portion 143 of the frame portion 140. Thus, it comes that the batteries 1B, the interposition members 130, and the clamping structure 120 which clamp these can be carried with the frame portion 140. In addition, the interposition members 130 and the non-sealed batteries 1B can be moved to the stacking direction DT along the connecting plate portion 143 within the frame portion 140. Further, because as described above, each of the interposition members 130 has the tapered portion 134, in a state in which the interposition members 130, 130 are arranged in line in the stacking direction DT, the non-sealed batteries 1B can be inserted from upward in the height direction DH into between the interposition portions 131 of the interposition members 130 easily.

Figure 11:
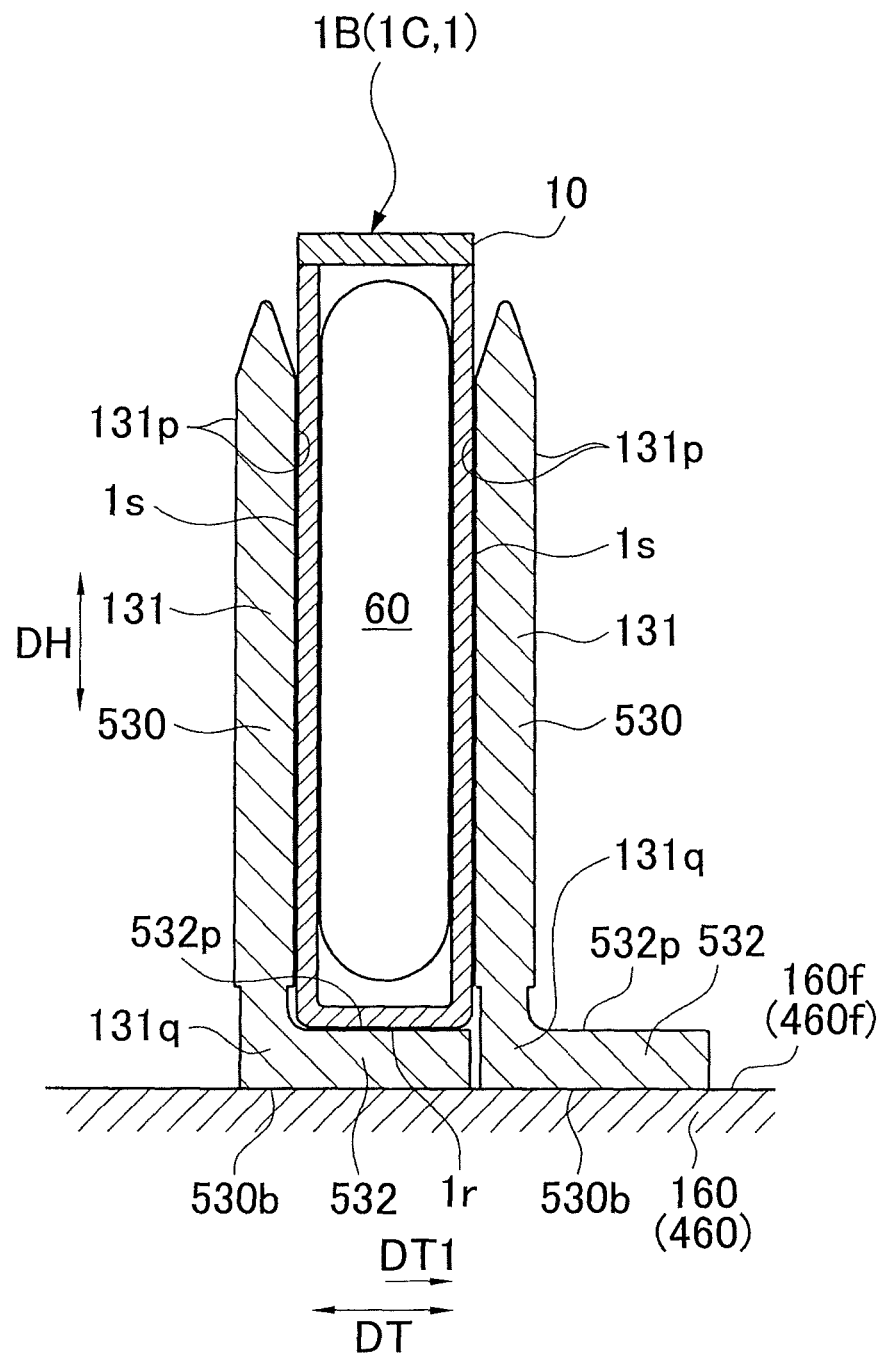
FIG. 11 is a sectional view of a battery and an interposition member in case where the interposition member of other example is used.

The base portion 132 (132a, 132b) has a flat battery contact face 132p directed upward in the height direction DH (upward in FIG. 5) (see FIG. 5). In the battery clamping device 110, the bottom face 1r (bottom portion 11b of the case main body 11) of the non-sealed battery 1B arranged between the interposition members 130 contacts the battery contact face 132p (see FIG. 6). Thus, the bottom face it of the non-sealed battery 1B contacts the battery contact face 132p on the base portion 132a, 132b via its wide area. In the first embodiment, base portion dimension TD swelling to the one side DT1 in the stacking direction from the interposition portion 131 of the base portion 132a and base portion dimension TD1b swelling to the other side DT2 in the stacking direction from the interposition portion 131 of the base portion 132b are equal to each other (TD1a=TD1b). Then, a sum of these (TD1a+TD1b) is assumed to be smaller than a gap TD2 in the stacking direction DT between the side faces 1s of the battery 1B (TD1a+TD1b<TD2, see FIG. 6). On the other hand, the interposition portion 131 has flat side face contact faces 131p which are perpendicular to the stacking direction DT on both sides in the stacking direction DT (see FIG. 5). The side face contact face 131p is larger than the side face is (first side wall portion 11x of the case main body 11) of the non-sealed battery 1B (see FIG. 6). Thus, the entire side face 1s of the non-sealed battery 1B contacts the side face contact face 131p of the interposition portion 131. The bottom face 130b of the interposition member 130 is a flat face which is located on an opposite side to the battery contact face 132p via the base portion 132a, 132b and parallel to the stacking direction DT (see FIG. 5). As described above, the interposition member 130 has the inverted T shape. Thus, when it is placed on a flat plate with the base portion 132 and the interposition portion 131 directed downward and upward respectively, the interposition member 130 is more unlikely to fall down to one side and easier to handle than an interposition member in which the base portion 132 swells to one side (shape of an interposition member 530 described below, see FIG. 11).

According to the manufacturing method of the battery 1 of the first embodiment, the non-sealed battery 1B is manufactured in a following method. That is, the belt-like positive electrode sheet 61 and the negative electrode sheet 62 are wound cylindrically to produce a wound body with the belt-like separator 63 interposed therebetween. Then, the cylindrical face of the wound body is deformed into a flat shape by pressing from both sides of the wound body to produce the electrode body 60. The positive electrode extending member 40 and the negative electrode extending member 50 are joined to the electrode body 60 and further connected to the sealing lid 13 in which the liquid pouring hole 13h has not been sealed. The electrode body 60 which is connected to the sealing lid 13 is accommodated in the case main body 11 and the sealing lid 13 is welded to the opening 11d of the case main body 11 so as to produce the non-sealed battery 1B whose inside and outside communicate with each other through the liquid pouring hole 13h (see FIGS. 1 and 2).

Next, clamping step of clamping the non-sealed batteries 1B with pressure using the battery clamping device 110 of the battery drying device 100 will be described. A plurality (25 in case of the first embodiment) of the non-sealed batteries 1B is arranged inside the frame portion 140 of the battery clamping device 110 such that they are stacked in the thickness direction DT. In the meantime time, after arranging the plurality (26 in case of the first embodiment) of the interposition members 130 within the frame portion 140 preliminarily, the interposition portions 131 of the interposition members 130 are interposed between the non-sealed batteries 1B and 1B, between the non-sealed battery 1B and the first end plate 121, and between the non-sealed battery 1B and the second end plate 122. Next, the non-sealed batteries 1B and the interposition members 130 are pressed and clamped in the stacking direction DT using the clamping structure 120. More specifically, first, the stopper bolt 123 is passed through the through hole in the main body EP1 of the pressing tool EP and the four pressing portions EP2, EP2 of the pressing tool EP are passed through the four through holes 141z, 141z in the first wall portion 141 and brought into contact with the first end plate 121 (see FIG. 4). Next, the main body EP1 of the pressing tool EP is moved to the other side DT2 in the stacking direction until a desired reaction force is obtained. As a result, the pressing portions EP2 move the first end plate 121 to the other side DT2 in the stacking direction. Thus, the first end plate 121 is brought close to the second end plate 122, so that the first end plate 121 and the second end plate 122 press and clamp the non-sealed batteries 1B and the interposition members 130 arranged therebetween along the stacking direction DT. After that, the stopper bolt 123 is turned in the normal direction and when the front end portion 123t of the stopper bolt 123 comes into contact with the first end plate 121, turning of the stopper bolt 123 in the normal direction is stopped. Then, the stopper bolt 123 is fixed to the first wall portion 141. As a result, a position in the stacking direction DT of the first end plate 121 can be fixed, so that the non-sealed batteries 1B and the interposition members 130 can be pressed by the first end plate 121 and the second end plate 122 with a desired pressing force in the stacking direction DT and clamped therebetween. After fixing the stopper bolt 123, the pressing tool EP is removed from the battery clamping device 110.

In the battery clamping device 110 of the first embodiment, as shown in FIG. 6, the side face is of the battery 1B is in contact with the side face contact face 131p of the interposition portion 131 of the interposition member 130. Thus, friction is caused between the battery 1B and the interposition portion 131, so that the battery 1B cannot be moved (displaced) easily relative to the interposition portion 131 in a direction perpendicular to the stacking direction DT (height direction DH or width direction DW). On the other hand, the bottom face 1r of the battery 1B contacts the battery contact face 132p of the base portion 132 formed integrally with the interposition portion 131 of the interposition member 130. Thus, even if when the battery 1B is pressed in the stacking direction DT, the bottom portion 11b of the case main body 11, that is, the bottom face 1r of the battery 1B attempts to be deformed to swell outward (downward in the Figure), the battery 1B cannot be moved (displaced) in the height direction DH, so that the bottom face 1r is pressed by the base portion 132 thereby suppressing the above-described swelling deformation. Thus, by using the battery clamping device 110 of the present embodiment 1, even if the batteries 1B are pressed in clamping step, it is possible to prevent the swelling of the bottom face 1r (bottom portion 11b) of the battery 1B and permanent deformation by swelling of the bottom face 1r from being left.

Because, as described above and shown in FIG. 6, the base portion dimensions TD1a, TD1b and the gap TD2 between the side faces of the battery 1B have a relationship of TD1a+TD1b<TD2, the base portion 132a of the interposition member 130, in the battery clamping device 110, is apart from the base portion 132b of the adjacent interposition member 130 which adjoins across the battery 1B, in the stacking direction DT (in the first embodiment, apart approximately 0.5 mm). Consequently, in the battery clamping device 110, with the non-sealed batteries 1B clamped between the interposition portions 131 of the interposition member 130, the side face 1s of the non-sealed battery 1B and the interposition portion 131 of the interposition member 130 can be brought into pressure-contact with each other equally in the stacking direction DT without distortion. The interposition member 130 is configured in such a dimension that it does not contact any adjacent interposition member 130 which clamps the battery 1B not only at the base portion 132 as described above, but also at other portions including the projecting portion 133 and the like.

Next, the heating/drying step will be described. In the first half of the heating/drying step, the battery heating device 150, the battery clamping device 110 and the plate heater 160 in the aforementioned battery drying device 100 are used (see FIG. 3). First, the battery clamping device 110 in which the non-sealed batteries 1B and the interposition members 130 have been clamped in the above-described clamping step is mounted on the mounting face 160f of the plate heater 160. At this time, the bottom face 130b of each interposition member 130 is in contact with the mounting face 160f. That is, the entire flat bottom face 130b of the interposition member 130 is in contact with the mounting face 160f of the flat plate heater 160.

After mounting the battery clamping device 110, the non-sealed batteries 1B are heated using the plate heater 160. More specifically, heat is generated by energizing the electric heater 161 via the lead wire 162 under the atmosphere. Then, heat is transmitted to the base portions 132a, 132b of the interposition member 130 and the end portion 131q of the interposition portion 131 from the mounting face 160f of the plate heater 160 via the bottom face 130b of the interposition member 130. Heat is further transmitted to the battery 1B via the bottom face 1r which the battery contact face 132p of the base portions 132a, 132b contacts and to the non-sealed battery 1B via the side face 1s which the side face contact face 131p of the interposition portion 131 contacts with pressure also. Because air exists in the battery 1B, heat is transmitted via air in the battery 1B. Thus, for example, heat which has been transmitted to the bottom face 1r (bottom portion 11b) is transmitted to the electrode body 60 through the first side wall portion 11x of the case main body 11, and may be transmitted via air between the bottom face 1r (bottom portion 11b) and the electrode body 60. In this way, the non-sealed battery 1B is heated efficiently (see FIG. 6).

In the first embodiment, raising the temperature at a central part of the electrode body 60 of the non-sealed battery 1B (a part in the center of the winding axis of the electrode body 60 along the axial direction) from the normal temperature to a target temperature can be performed in a period approximately ⅕ compared to a case in which the non-sealed battery 1B is heated with radiant heat from a furnace wall heater under the vacuum environment using a vacuum drying furnace, for example.

Subsequently, drying of the inside of the battery 1B in the second half is performed. For this drying, as well as the aforementioned battery clamping device 110 and the plate heater 160, the depressurizing device 170 containing the depressurizing chamber 171 which accommodates these components is used (see FIG. 3). More specifically, after raising the temperature as described above, the battery clamping device 110 (non-sealed batteries 1B whose temperature has been raised) in which the temperature is maintained is arranged within the depressurizing chamber 171 and the inside of the chamber is turned into airtight state. Then, the inside of the depressurizing chamber 171 is depressurized to a vacuum state (more specifically, a state in which the atmospheric pressure in the chamber is 1 kPa or less) using the vacuum pump 172 and moisture in the non-sealed battery 1B is discharged outside via the liquid pouring hole 13h so as to dry the inside of the non-sealed battery 1B. In the meantime, heating and raising the temperature of the battery 1B using the above-described plate heater 160 may be performed within the depressurizing chamber 171 and subsequently, the inside of the depressurizing chamber 171 may be depressurized. Further, on the halfway of temperature rise of the battery 1B by the heater, the depressurizing of the depressurizing chamber 171 may be started.

Figure 7:
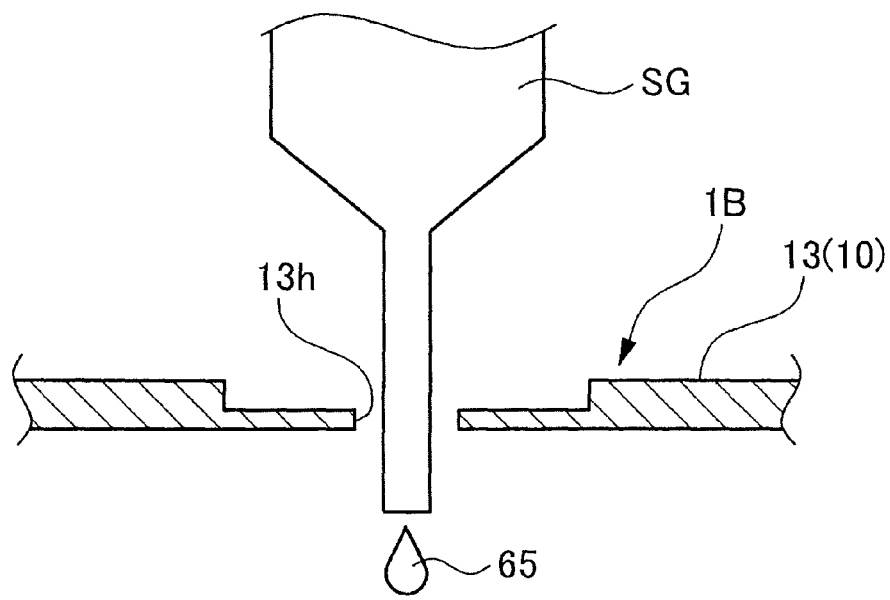
FIG. 7 is an explanatory diagram of liquid pouring step in the battery manufacturing method according to the first embodiment.

Next, liquid pouring step is performed. In the liquid pouring step, electrolyte 65 of a specified amount is poured into the non-sealed battery 1B via the liquid pouring hole 13h which is open into the battery case 10 of the non-sealed battery 1B using a known syringe SG (see FIG. 7).

Figure 8:
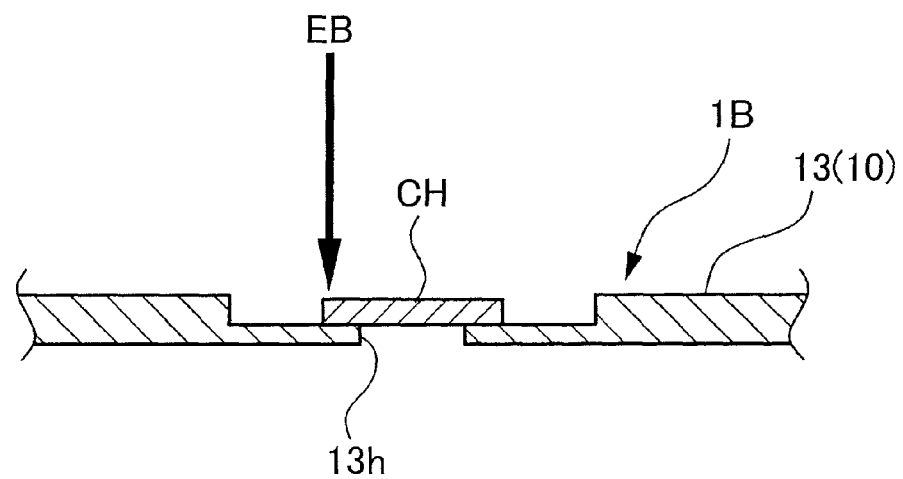
FIG. 8 is an explanatory diagram of sealing step in the battery manufacturing method according to the first embodiment.

Subsequently, sealing step for sealing the liquid pouring hole 13h is performed. More specifically, the liquid pouring hole 13h of the non-sealed battery 1B after pouring electrolyte 65 in the above-described liquid pouring step is sealed with a metallic sealing plug CH. More specifically, after the circular sealing plug CH is placed on the sealing lid 13 such that it closes the liquid pouring hole 13h, the periphery of the sealing plug CH is joined with a part of the sealing lid 13 which is an external periphery of the liquid pouring hole 13h by using laser beam EB so as to seal the liquid pouring hole 13h (see FIG. 8).

After the above-described sealing step, the liquid pouring hole 13h is sealed and a not-initially charged battery 1C which has not undergone the initial charge is removed from the battery clamping device 110, and the initial charging, high-temperature aging, measurement of capacity and measurement of resistance are performed using a known method. As a result, the battery 1 is completed. In the battery clamping device 110 for use in manufacturing the battery 1 of the first embodiment, as described above, when the non-sealed batteries 1B are pressed in the stacking direction DT and clamped, the base portion 132a and the adjacent base portion 132b are apart from each other in the stacking direction DT but not in contact therewith (more specifically, apart by approximately 0.5 mm). In the above-described heating/drying step, to prevent the base portion 132a and the adjacent base portion 132b from contacting each other even when heating by means of the plate heater 160, it is permissible to set the dimensions TD1a, TD1b in the stacking direction DT of the base portions 132a, 132b, considering the magnitude of thermal expansion in the stacking direction DT generated in the base portions 132a, 132b. As a result, even if the base portions 132 are thermally expanded by heating in the heating/drying step, they never come into contact with each other, thereby preventing uneven pressing in the stacking direction DT or decreasing in pressing force due to the contact between the interposition members 130.

The manufacturing method of the battery 1 according to the first embodiment includes the aforementioned clamping step, heating/drying step, liquid pouring step and sealing step. In clamping step, the interposition portion 131 of the interposition member 130 contacts the side face 1s of the non-sealed battery 1B with pressure and at the same time, the base portion 132 (132a, 132b) of the interposition member 130 contacts the bottom face 1r of the non-sealed battery 1B. Thus, in heating/drying step, by transmitting heat generated in the plate heater 160 to the non-sealed battery 1B via the interposition portion 131 of the interposition member 130 and the base portion 132, the non-sealed battery 1B can be heated. Particularly, in the first embodiment, because the non-sealed battery 1B is heated prior to depressurization by means of the depressurizing device 170, heat is transmitted to respective portions via air in the battery 1B (battery case 10), and compared to a case of heating and drying by radiation under reduced pressure (under vacuum), the non-sealed battery 1B can be heated more efficiently in a short time thereby drying the inside of the battery.

Further, the battery drying device 100 of the first embodiment includes the battery heating device 150 which contains the aforementioned battery clamping device 110 and the plate heater 160, and the depressurizing device 170 which depressurizes the inside of the depressurizing chamber 171 containing the battery clamping device 110 and the plate heater 160. Thus, upon drying in the aforementioned heating/drying step with the non-sealed batteries 1B clamped by the battery clamping device 110 in the aforementioned clamping step, the base portion 132 (battery contact face 132p) of the interposition member 130 contacts the bottom face 1r of the non-sealed battery 1B and the interposition portion 131 (side face contact face 131p) of the interposition member 130 contacts the side face 1s of the non-sealed battery 1B with pressure. Thus, heat transmitted from the plate heater 160 to the interposition member 130 can be transmitted to the non-sealed battery 1B via the interposition portion 131 and the base portion 132 to heat the non-sealed battery 1B. In the battery drying device 100 of the first embodiment, the battery 1B can be heated efficiently and the battery 1B can be dried efficiently.

Further, in the battery drying device 100 (battery heating device 150), the bottom face 130b of the interposition member 130 is formed into a flat shape. Further, because the mounting face 160f of the plate heater 160 is also formed into a flat shape, the entire bottom face 130b of each interposition member 130 can be brought into contact with the mounting face 160f. Thus, heat generated in the plate heater 160 can be transmitted from the mounting face 160f to the bottom face 130b efficiently to heat the non-sealed battery 1B securely. As a result, the battery 1B can be heated in a short time.

Further, the interposition member 130 of the battery clamping device 110 in the battery drying device 100 (battery heating device 150) is made of highly heat conductive metal having thermal conductivity of 100 W/(m·K) or more (more specifically, 155 W/(m·K)). Thus, heat transmitted to the base portion 132 of the interposition member 130 and the end portion 131q of the interposition portion from the plate heater 160 can be transmitted to the non-sealed battery 1B efficiently via the base portion 132 efficiently and the interposition portion 131, thereby heating the non-sealed battery 1B further appropriately. Particularly, upon transmitting heat to the battery 1B via the side face 1s of the battery 1B whose distance from the bottom face 130b of the interposition member 130 is larger than the bottom face 1r of the battery 1B, heat can be transmitted to the battery 1B efficiently via the interposition member 130 and the side face 1s of the battery 1B, because the interposition member 130 is made of metal having excellent heat conductivity.

Second Embodiment

Next, a manufacturing method of the battery 1 according to the second embodiment of the present invention will be described. The second embodiment includes a step of performing initial charge (initial charging step) to a not-initially charged battery 1C (hereinafter referred to as just battery 1C) which has not undergone the initial charge while pressed and clamped by using the aforementioned battery clamping device 110.

The manufacturing method of the battery 1 according to the second embodiment includes clamping step of pressing the not-initially charged batteries 1C in the stacking direction DT and clamping after stacking a plurality of the not-initially charged batteries 1C in the stacking direction DT and initial charging step of performing the initial charge to each clamped not-initially charged battery 1C.

First, clamping step is performed. In this clamping step, instead of the non-sealed batteries 1B of the first embodiment, the not-initially charged batteries 1C are pressed in the stacking direction DT and clamped using the same battery clamping device 110 as the first embodiment. In the same manner as the aforementioned first embodiment, a plurality of the not-initially charged batteries 1C, 1C are arranged with the interposition members 130 alternately such that they are stacked in the thickness direction DT and disposed inside the frame portion 140 of the battery clamping device 110. The not-initially charged batteries 1C and the interposition members 130 are clamped in the stacking direction DT using the clamping structure 120 (see FIG. 4).

In the meantime, as shown in FIG. 6, because the side face 1s of the battery 1C is in pressure contact with the side face contact face 131p of the interposition portion 131 of the interposition member 130 even in the battery clamping device 110 of the second embodiment, the battery 1C cannot move in a direction perpendicular to the stacking direction DT (height direction DH or width direction DW) easily relative to the interposition portions 131. On the other hand, the bottom face 1r of the battery 1C contacts the battery contact face 132p of the base portion 132 formed integrally with the interposition portion 131 of the interposition member 130. As a result, when the battery 1C is pressed in the stacking direction DT, the battery 1C is prevented from being deformed such that the bottom face 1r thereof swells outward (downward in the Figure). In this way, by using the battery clamping device 110 in the second embodiment also, even when the battery 1C is pressed strongly in clamping step, swelling of the bottom face 1r of the battery 1C or remaining of permanent deformation by swelling on the bottom face 1r can be prevented.

Figure 9:
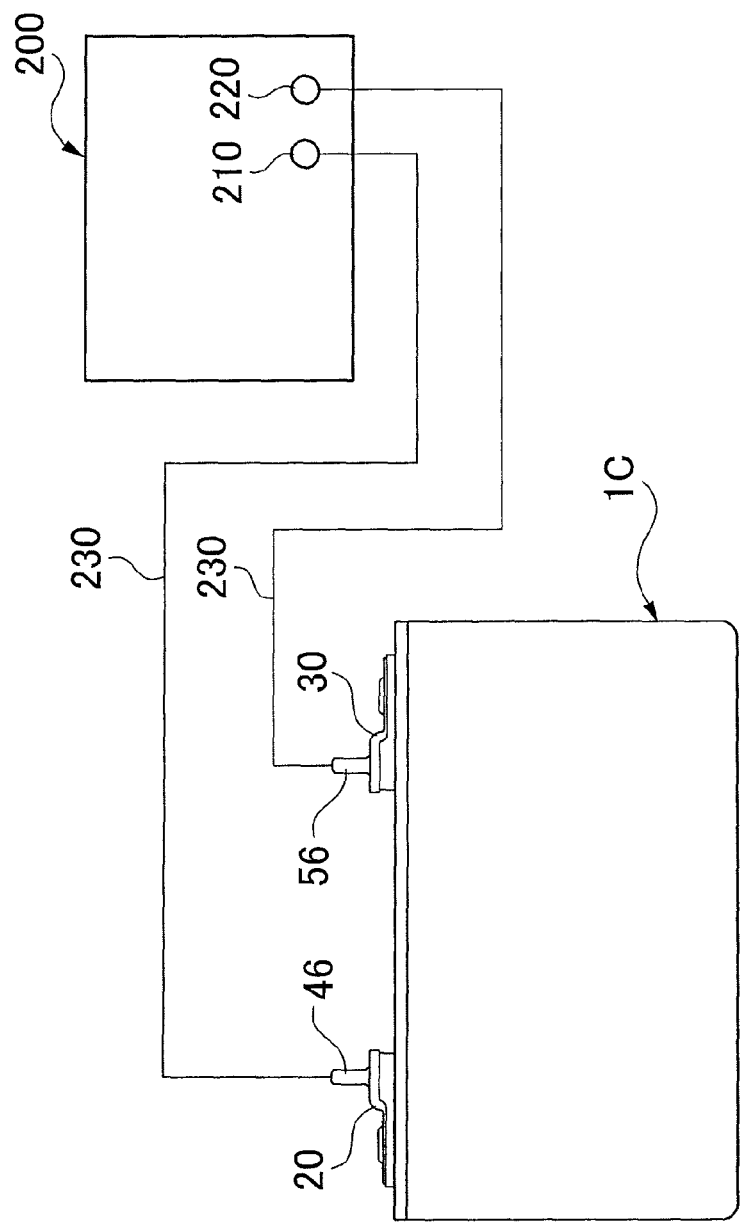
FIG. 9 is an explanatory diagram of initial charging step in the battery manufacturing method according to the second embodiment.

Next, the initial charging step is performed. In this initial charging step, the initial charge is performed for the not-initially charged batteries 1C clamped by the battery clamping device 110 using the power supply unit 200. More specifically, the positive electrode terminal 210 of the power supply unit 200 is connected to the positive electrode bolt 46 of the not-initially charged battery 1C, and the negative electrode terminal 220 is connected to the negative electrode bolt 56 via conducting wire 230 (see FIG. 9). After the connection, constant-current, constant-voltage charge is performed under a temperature of 25° C. so as to charge the not-initially charged battery 1C fully.

After the above-described initial charging step, each battery 1C is removed from the battery clamping device 110 and then, high-temperature aging, measurement of capacity and measurement of resistance are performed using a known method to obtain the battery 1. In the second embodiment, the batteries 1C are stacked with the interposition members 130 made of aluminum having excellent thermal conductivity (155 W/(m·K)) alternately so that they are clamped in the stacking direction DT, and the initial charging step is performed. Thus, because the side face 1s of the battery 1C contacts the side face contact face 131p of the interposition portion 131 of the interposition member 130 with pressure and the bottom face 1r of the battery 1C contacts the battery contact face 132p of the base portion 132 of the interposition member 130, heat generated from the battery 1C accompanied by the initial charge can be radiated outside the battery 1C via the interposition member 130 efficiently.

Further, the manufacturing method of the battery 1 according to the second embodiment includes clamping step of clamping the not-initially charged batteries 1C with the battery clamping device 110 and initial charging step of performing the initial charge to each battery 1C in this state. Thus, each battery 1C clamped with an appropriate pressing force can undergo the initial charge while preventing generation of deformation by swelling of the bottom face 1r (bottom portion 11b). Thus, when constituting a battery pack (not shown) using the batteries 1 after manufactured, even if the batteries 1, 1 are arranged in line such that their bottom faces 1r contact a flat plate, the height dimensions of the batteries 1, 1 from the bottom face 1r can be made equal. Thus, positions in the height direction DH of the external terminal members 20, 30 are set equal to each other. As a result, the battery 1 in which the external terminal members 20, 30 thereof can be connected appropriately to each other using the flat bus bar or the like can be manufactured.

Further, the interposition member 130 of the above-described battery clamping device 110 includes the interposition portion 131 which is interposed between the not-initially charged batteries 1C and 1C and the base portion 132 which is formed integrally with the interposition portion 131 and stretched to both sides DT1, DT2 in the stacking direction DT from the end portion 131q of the interposition portion 131, and which the bottom face 1r of the battery 1C contacts. Thus, the battery clamping device 110 can clamp the batteries 1C while preventing deformation by outward swelling of the bottom face 1r of the battery 1C.

In the battery 1C for use in the second embodiment, the thickness T13 of the sealing lid 13 is defined to be larger than the thickness T11 of the bottom portion 11b of the case main body 11 (see FIG. 2). Thus, when the battery 1C is pressed in the thickness direction DT, deformation by swelling is more likely to occur on the bottom portion 11b of the case main body 11 than the sealing lid 13. However, by clamping the non-sealed batteries 1B in the stacking direction DT using the above-described battery clamping device 110, the bottom face 1r (bottom portion 11b) can be prevented from being permanently deformed by swelling securely.

Further, when clamping the batteries 1C in the stacking direction DT in the battery clamping device 110, the base portion 132a is apart from the adjacent interposition member 130 (base portion 132b thereof) in the stacking direction DT such that they never contact each other. Thus, with the battery 1C clamped between the interposition members 130, the interposition portion 131 of the interposition member 130 can be brought into contact with the side face 1s of the not-initially charged battery 1C equally.

Further, because the base portion 132 is stretched to both sides DT1, DT2 in the stacking direction DT from the interposition portion 131, the interposition member falls down less easily than the interposition member of a type in which the base portion is stretched only to one side (e.g., interposition member 530 described below) and is easier to handle.

Further, in the battery clamping device 110, a sum TD1a+TD1b of the base portion dimensions TD1a, TD1b of the base portions 132a, 132b is smaller than the gap TD2 between the side faces 1s of the battery 1C (TD1a+TD1b<TD2). Thus, when the non-sealed battery 1B is clamped by the battery clamping device 110, the base portions 132a, 132b are apart from each other in the stacking direction DT such that they never contact each other. Therefore, the side face 1s of the non-sealed battery 1B and the interposition portion 131 of the interposition member 130 can be brought into pressure contact with each other securely.

Third Embodiment

Next, the battery heating device according to the third embodiment of the present invention will be described. The battery heating device 300 includes the battery clamping device 110 and the plate heater 160 configured to heat the battery clamping device 110 like the first embodiment and additionally, a thermostat chamber 310 which accommodates these components internally (see FIG. 3). As described above, the interposition member 130 of the battery clamping device 110 is made of aluminum (aluminum alloy) having thermal conductivity of 155 W/(m·K)) and the bottom face 130b is formed into a flat face. On the other hand, the plate heater 160 has the flat mounting face 160f on which the battery clamping device 110 is mounted.

The battery heating device 300 can be used for the high-temperature aging step after the initial charge, for example, in manufacturing step of the battery 1 for heating of the battery and holding thereof at high temperatures. Further, it can be used to heat a plurality of the batteries after a completion of the batteries 1 or after usage thereof. In high-temperature aging step, for example, the batteries 1 and the interposition members 130 are first stacked alternately in the thickness direction DT and clamped with a pressure using the same battery clamping device 110 as the first and second embodiments. Next, the battery clamping device 110 which clamps the batteries 1 or the like is mounted on the mounting face 160f of the plate heater 160 within the thermostat chamber 311 whose temperature is set to a predetermined temperature (e.g., 60° C.) and then, it is heated with the plate heater 160. After the batteries 1 reach the predetermined temperature (60° C.), heating by the plate heater 160 is stopped and the batteries 1 are left within the thermostat chamber 311 whose temperature is maintained at the predetermined temperature (60° C.) for 24 hours in a state in which they are clamped by the battery clamping device 110.

The battery heating device 300 according to the third embodiment includes the aforementioned battery clamping device 110 and the plate heater 160 on which the battery clamping device 110 clamping the batteries 1 is mounted to heat the batteries 1. In addition, the plate heater 160 is configured to be capable of heating the interposition members 130 via the bottom faces 130b of the interposition members 130 which contacts the mounting face 160f. Thus, heat can be transmitted from the plate heater 160 to the end portion 131q and the base portion 132 of the interposition portion 131 efficiently. Further, heat can be transmitted to the battery 1 from the end portion 131q and the base portion 132 via the bottom face 1r of the battery 1 which contacts the base portion 132. Further, heat can be transmitted to the battery 1 via the side face 1s of the battery 1 which contacts the interposition portion 131 also. As a result, the battery 1 can be heated efficiently.

Further, because the interposition member 130 is made of metal having excellent thermal conductivity (thermal conductivity of 155 W/(m·K)) like the aforementioned first and second embodiments, heat generated by the plate heater 160 can be transmitted to the battery 1 efficiently via the interposition portion 131 and the base portion 132 thereby heating the battery 1 securely. As a result, the battery 1 can be heated to a high-temperature state quickly.

In the battery heating device 300 also, the bottom face 130b of the interposition member 130 is formed into a flat face and the mounting face 160f of the plate heater 160 is also formed into a flat face. Thus, the entire bottom face 130b of the interposition member 130 can be brought into contact with the mounting face 160f. Therefore, heat of the plate heater 160 can be transmitted to the interposition member 130 efficiently via the mounting face 160f and the bottom face 130b, thereby heating the battery 1 securely.

Fourth Embodiment

Figure 10:
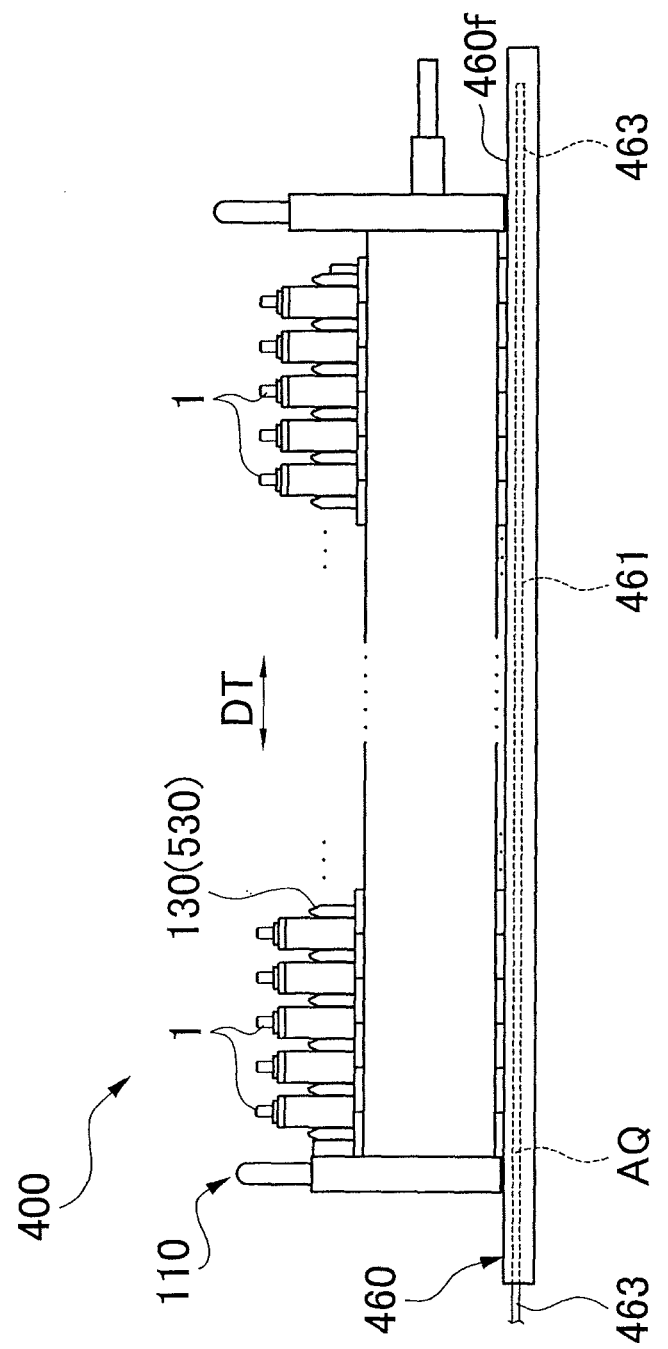
FIG. 10 is an explanatory diagram of a battery cooling device according to the fourth embodiment.

Next, the battery cooling device according to a fourth embodiment will be described. As shown in FIG. 10, the battery cooling device 400 includes the same battery clamping device 110 as the first embodiment and a cooling plate 460 for cooling the battery clamping device 110 (see FIG. 10). In the meantime, the interposition member 130 of the battery clamping device 110 is made of aluminum (aluminum alloy) having thermal conductivity of 155 W/(m·K)) like the aforementioned first embodiment and the bottom face 130b is formed into a flat face.

The cooling plate 460 is made of rectangular flat-shaped aluminum having the flat mounting face 460f and a heat absorbing mechanism 461 is provided therein. The heat absorbing mechanism 461, specifically, is a mechanism which circulates cooling water AQ through a tubular distribution channel 463 provided in the cooling plate 460 (see FIG. 10). In the cooling plate 460, the distribution channel 463 is formed in a wide area so that heat transmitted to the mounting face 460f can be conveyed away (absorbed) outside via cooling water AQ flowing through the distribution channel 463 quickly. In the meantime, the mounting face 460f of the cooling plate 460 is designed in a size allowing the entire battery clamping device 110 clamping the batteries 1 to be mounted thereon. When the battery clamping device 110 is mounted on the mounting face 460f of the cooling plate 460, the mounting face 460f contacts the bottom face 130b of the interposition member 130 and the interposition member 130 can be cooled via the bottom face 130b.

The battery cooling device 400 can be used to hold the batteries 1 in a state in which they are clamped by the battery clamping device 110 at a low temperature or cool the battery clamping device 110 and the batteries (the aforementioned non-sealed battery 1B or battery 1) after cooling cycle test of changing the temperature of the battery 1 in the clamped state to high/low repeatedly or the aforementioned heating/drying step or high-temperature aging step, for example.

The battery cooling device 400 according to the fourth embodiment includes the aforementioned battery clamping device 110 and the planar cooling plate 460 on which the battery clamping device 110 clamping the batteries 1 is mounted to cool the batteries 1. In addition, the cooling plate 460 includes the heat absorbing mechanism 461 for cooling the cooling plate 460 by circulating cooling water AQ through the distribution channel 463 and is configured to be capable of cooling the interposition member 130 via the bottom face 130b of the interposition member 130 which contacts the mounting face 460f. Thus, heat can be transmitted from the bottom face 130b of the interposition member 130 to the cooling plate 460 efficiently. In the battery clamping device 110 clamping the batteries 1, the base portion 132 of the interposition member 130 contacts the bottom face 1r of the battery 1 and the interposition portion 131 of the interposition member 130 contacts the side face is of the battery 1 with pressure. Thus, not only heat from the battery 1 can be transmitted to the base portion 132 via the bottom face 1r of the battery 1 but also heat can be transmitted to the end portion 131q of the interposition portion 131 via the side face 1s of the battery 1. Further, heat can be transmitted to the cooling plate 460 via the bottom face 130b of the interposition member 130. As a result, the battery 1 can be cooled efficiently thereby reducing the cooling period.

Further in the battery cooling device 400, the bottom face 130b of the interposition member 130 is formed into a flat face. Further, the mounting face 460f of the cooling plate 460 is a flat surface, which the bottom face 130b of each interposition member 130 contacts. As a result, the entire bottom face 130b of each interposition member 130 can be brought into contact with the mounting face 460f. Thus, heat from the battery 1 can be transmitted to the cooling plate 460 via the bottom face 130b and the mounting face 460f further efficiently, thereby cooling the battery 1 securely.

The interposition member 130 of the battery clamping device 110 of the battery cooling device 400 is made of highly thermally conductive metal (thermal conductivity of 155 W/(m·K) like the aforementioned first to third embodiments. Thus, heat of the battery 1 can be transmitted to the cooling plate 460 efficiently via the interposition portion 131 and the base portion 132 of the interposition member 130 efficiently, thereby cooling the battery 1 securely. As a result, the battery 1 can be cooled quickly.

Although the present invention has been described regarding the first to fourth embodiments above, the present invention is not restricted to the above-described embodiments, but needless to say, the present invention may be modified appropriately within a range not departing from the gist thereof. For example, the first embodiment and the like indicate an example in which the base portions 132 of the interposition member 130 are projected to both sides in the stacking direction DT from the interposition portion 131 (see FIGS. 5, 6). However, as well as this example, an interposition member 530 of type in which a base portion 532 is projected to one side DT1 of the stacking direction DT from the interposition portion 131 (L-shaped cross section) can be mentioned (see FIG. 1). In the first embodiment and the like, the interposition member 130 made of aluminum alloy is indicated. As an interposition member made of metal having thermal conductivity of 100 W/(m·K) or more, an interposition member made of, for example, pure aluminum having thermal conductivity of 236 W/(m·K), pure copper having thermal conductivity of 398 W/(m·K) or brass having thermal conductivity of 106 W/(m·K) may be used. Further, although in the fourth embodiment, as the cooling unit of the battery cooling device, the cooling plate 460 which circulates cooling water AQ internally has been indicated, it is permissible to use Peltier element, for example, also.

What is claimed is:

1. A battery clamping device comprising:
   an interposition member configured to be interposed between rectangular parallelepiped batteries such that the interposition member is stacked with a plurality of the batteries alternately;
   a clamping portion configured to clamp by pressing the stacked batteries and the interposition member in a stacking direction of the batteries and the interposition member, from outside in the stacking direction, the interposition member includes an interposition portion which is interposed between the batteries and contact a side face perpendicular to the stacking direction of the battery and includes a base portion which is formed integrally with the interposition portion so as to be stretched at least to one side in the stacking direction from an end portion of the interposition portion thereby the base portion contacts a connecting face of the battery which connects the side faces of the battery to each other;

a heater configured so that the battery clamping device clamping the batteries is mounted thereon to heat the batteries during manufacturing the batteries; and a depressurizing device including a depressurizing chamber that accommodates the battery heating device and a depressurizing pump for depressurizing the depressurizing chamber, wherein the interposition member includes a battery contact face of the base portion which contacts the connecting face of the battery and includes a bottom face which is located on an opposite side to the battery contact face across the base portion and opposed to the heater, and wherein the heater provides a bottom face contact face which the bottom face of the interposition member contacts and is configured to be capable of heating the interposition member via the bottom face which contacts the bottom face contact face.

2. The battery clamping device according to claim 1, wherein
the base portion of the interposition member, when the battery is clamped between the interposition member and adjacent interposition member, is apart from the adjacent interposition member in the stacking direction.

3. The battery clamping device according to claim 1, wherein
the base portion of the interposition member is stretched to both sides in the stacking direction from the end portion of the interposition portion.

4. The battery clamping device according to claim 3, wherein
the base portion has a configuration in which a sum of the dimensions of the base portions stretched in the stacking direction from the interposition portion is smaller than a gap between the side faces of the battery in the stacking direction.

5. The battery heating device according to claim 1, wherein
the bottom face of the interposition member is formed into a flat face,
the bottom face contact face of the heater is a flat face which contacts the bottom face of any of the interposition members.

6. The battery heating device according to claim 1, wherein
the interposition member is made of metal having thermal conductivity of 100 W/(m·K) or more.

7. A battery cooling device comprising:
the battery clamping device according to claim 1; and
a cooling unit on which the battery clamping device clamping the batteries is mounted to cool the batteries, wherein
the interposition member includes a battery contact face of the base portion which contacts the connecting face of the battery and includes a bottom face which is located on an opposite side to the battery contact face across the base portion and opposed to the cooling unit, and wherein
the cooling unit provides a bottom face contact face which the bottom face of the interposition member contacts and is configured to be capable of cooling the interposition member via the bottom face which contacts the bottom face contact face.

8. The battery cooling device according to claim 7, wherein
the bottom face of the interposition member is formed into a flat face, and wherein
the bottom face contact face of the cooling unit is a flat face which contacts the bottom face of any of the interposition members.

9. The battery cooling device according to claim 7, wherein
the interposition member is made of metal having thermal conductivity of 100 W/(m·K) or more.

* * * * *